(No Model.)  3 Sheets—Sheet 1.

A. SHEDLOCK.
PRESSURE INDICATOR AND RECORDER.

No. 336,668.  Patented Feb. 23, 1886.

Witnesses.
Wm. G. Stassett
Thos. Horel

Alfred Shedlock.
Inventor

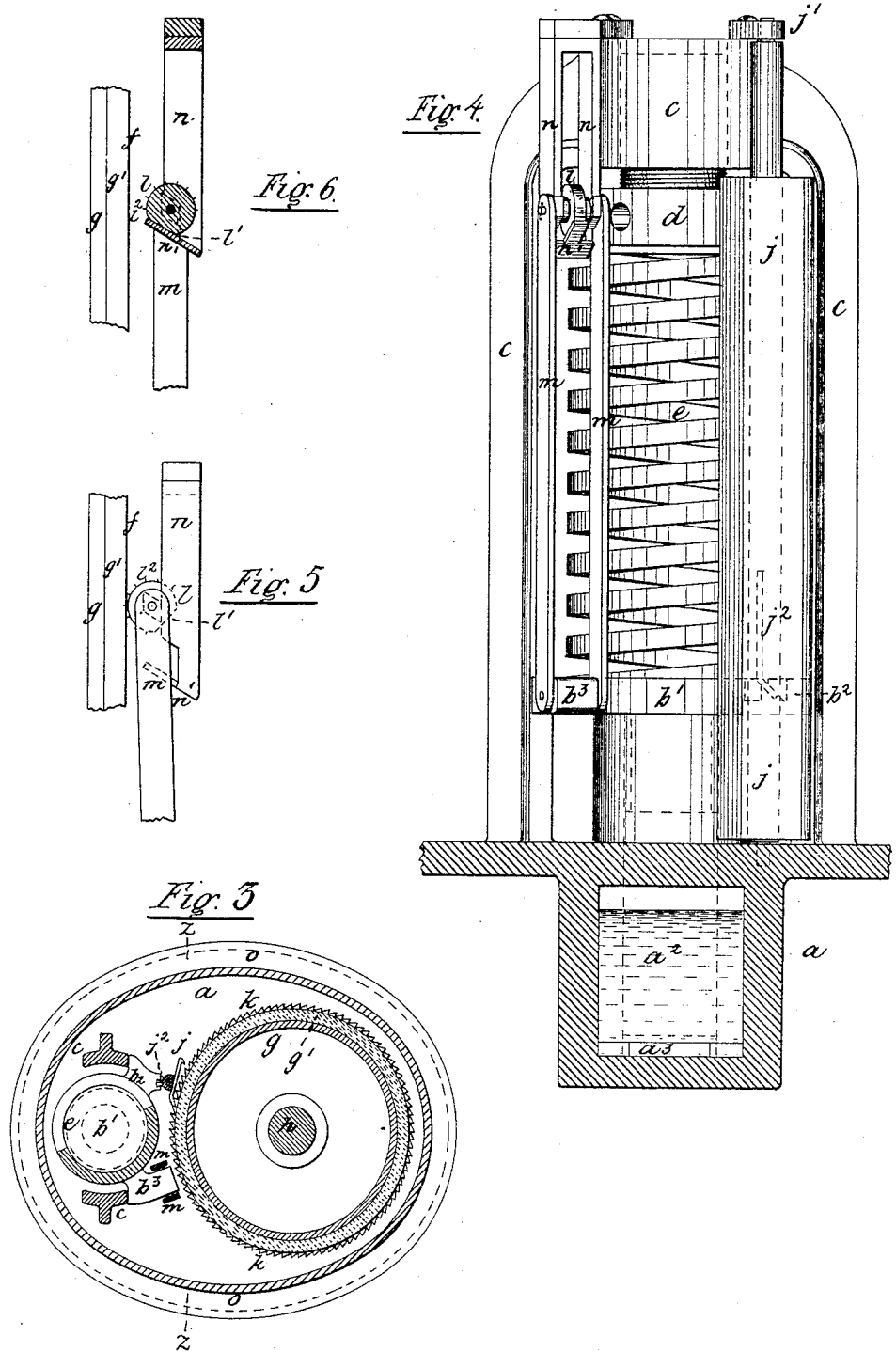

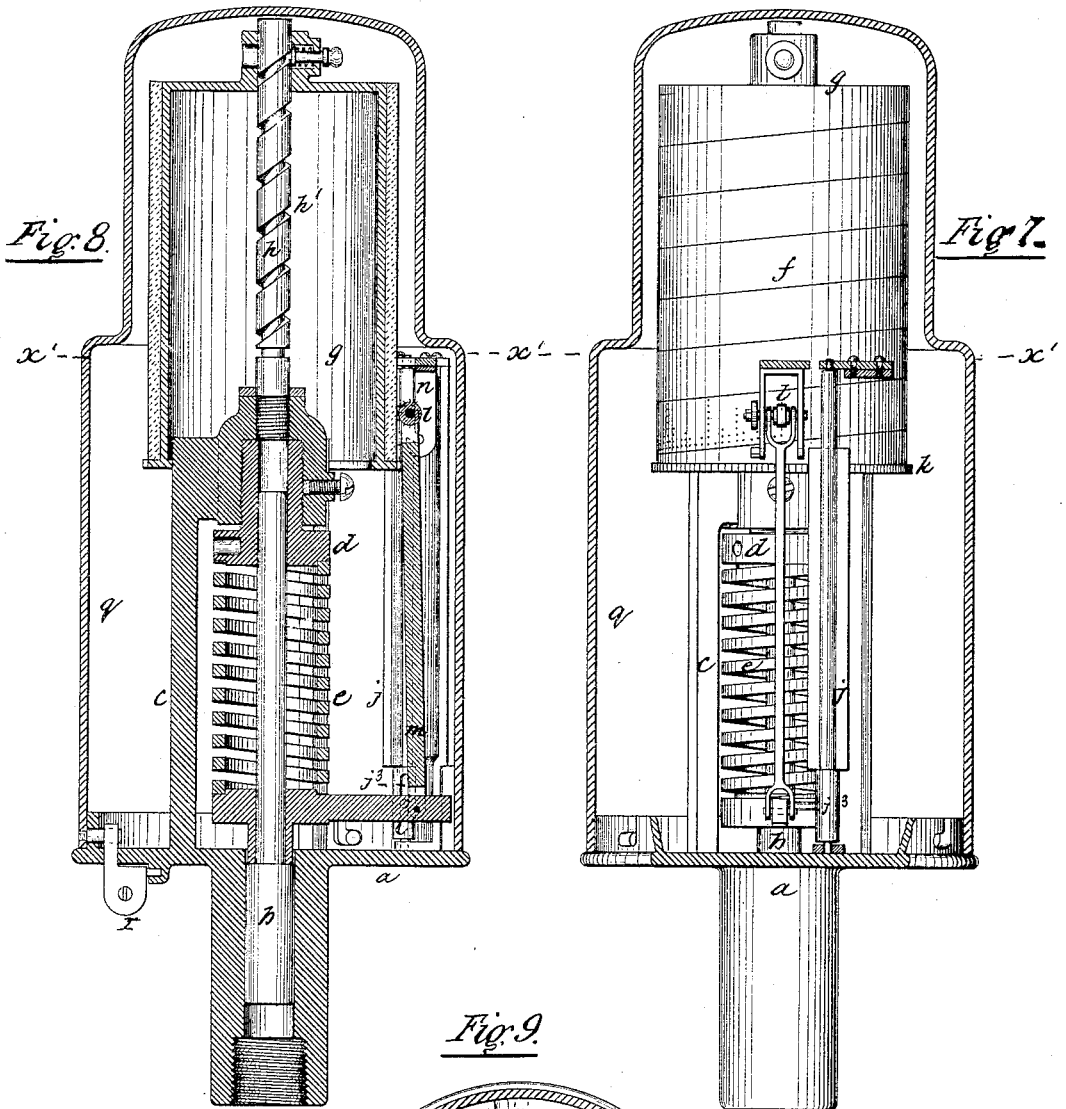

UNITED STATES PATENT OFFICE.

ALFRED SHEDLOCK, OF JERSEY CITY, NEW JERSEY, ASSIGNOR OF ONE-HALF TO CHARLES G. SINGER, OF NEW YORK, N. Y.

PRESSURE INDICATOR AND RECORDER.

SPECIFICATION forming part of Letters Patent No. 336,668, dated February 23, 1886.

Application filed August 12, 1885. Serial No. 174,185. (No model.)

*To all whom it may concern:*

Be it known that I, ALFRED SHEDLOCK, a citizen of the United States, residing at Jersey City, Hudson county, State of New Jersey, have invented a certain new and Improved Pressure Indicator and Recorder, of which the following is a specification.

This invention has for its object the production of a simple, strong, and effective apparatus for indicating and recording pressures, its particular application being to record the pressures of steam-boilers when above the normal working limit as a means of notification to proprietors and superintendents of the manner in which their boilers are attended by those in charge. Said apparatus, being securely locked in or placed at a distance from the boiler, also acts as a precautionary means, tending to make the employés in charge of the boiler more careful, as it is thus placed beyond their control and its indications are inaccessible to them. The force of gravity is utilized as the motive power to allow a number of consecutive indications to be made by causing a cylindrical indication-receiver to move helically, the movement of the same being controlled by a positive-acting feeding device, and the indications marked thereon by puncturing needle-points, which, with the feed device, are actuated by a piston or other means adapted to be moved by the pressures to be recorded.

Figure 1:
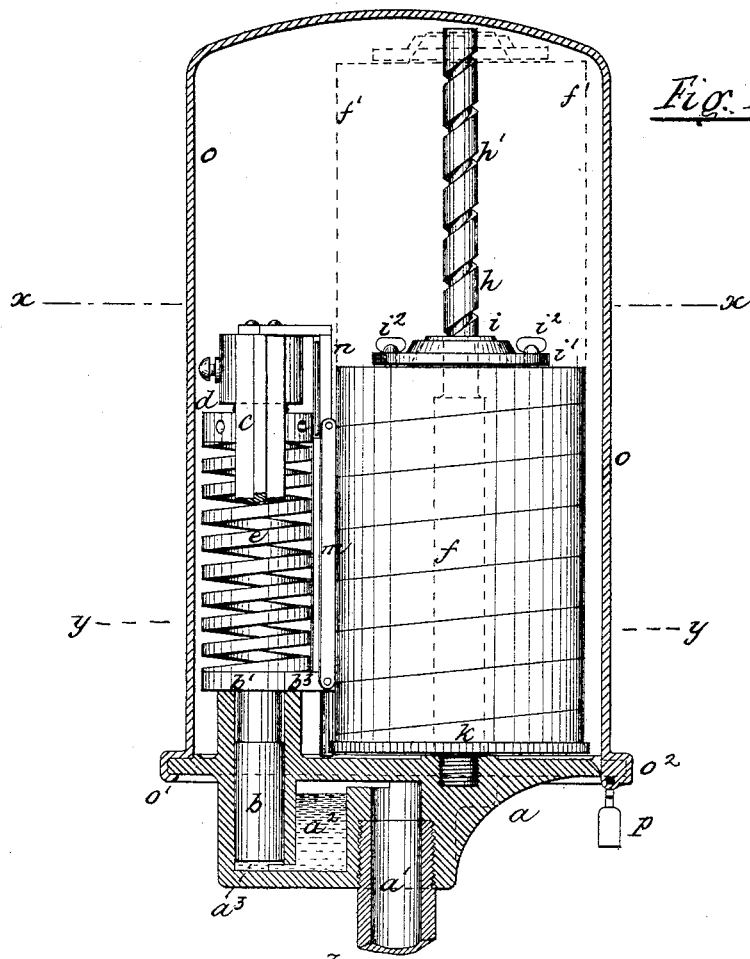
Figure 2:
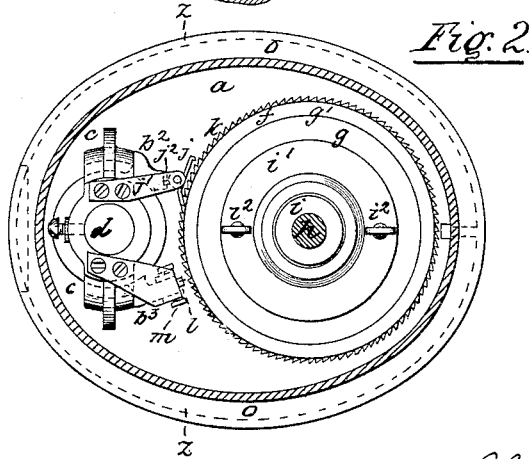

In the accompanying drawings, forming part of this specification, to which I will now refer, Figure 1, Sheet 1, is an elevation of my improved pressure-recorder, partly in section. Fig. 2, Sheet 1, is a plan view in section taken on the line $x\,x$. Fig. 3, Sheet 2, is a plan view in section taken on the line $y\,y$. Fig. 4, Sheet 2, is an enlarged vertical section taken on the line $z\,z$, looking toward the registering device and locking-pawl. Figs. 5 and 6, Sheet 2, are enlarged views of the registering devices in two different positions. Figs. 7, 8, and 9, Sheet 3, are respectively a front elevation, partly in section, a vertical central section, and a plan view in section, taken on the line $x'\,x'$, of a modification in the construction and arrangement of parts.

The base-plate $a$ is provided with a socket-opening in its central part, in which the pipe $a'$ is screwed, by which the apparatus is attached to the boiler or other power reservoir. This socket-opening communicates with the upper end of the chamber $a^2$, and this chamber $a^2$ with the lower end of the cylindrical cavity $a^3$, which cavity extends through the top of the base-plate $a$. In this cavity $a^3$ is fitted the vertically-moving piston $b$. The object of the chamber $a^2$ is to provide means for the reception of a fluid which will always fill the lower part of the cylinder $a^3$, to insure a tight and free working contact between the cylinder and its piston $b$, the steam or other pressure acting on the top of the fluid in the chamber $a^2$. This fluid may be water, due to condensation of steam, where the apparatus is applied to a steam-boiler, or any suitable oil may be used.

Above the cylindrical cavity $a^3$ is the bridge $c$, forming a part of or attached to the base-plate $a$. In the upper part of the bridge $c$ is fitted by a screw-thread the spring-cap $d$, between which and the top plate $b'$ of the piston $b$ is placed the spring $e$. The plate $b'$ of the piston has two projections, $b^2\,b^3$, arranged to bear against the side of the bridge $c$ and act as guides. One of said projections $b^2$ controls the locking or feeding device of the indication-receiver, and the other one, $b^3$, carries the registering or indicating device which marks the pressure-indications. This plate $b'$ rests on the edge of the cylindrical cavity $a^3$, and is held down by the spring $e$, the tension or active force of which is so regulated by turning the spring-cap $d$ that the piston commences to move up when the maximum working pressure of the boiler is attained.

The indication-receiver $f$ consists of paper or other suitable fabric placed over the cylindrical holder $g$, which is preferably provided with an elastic covering, $g'$, so that the paper $f$ is held in position, it being of a size to fit snugly thereon and also to permit of the ready puncturing of the paper, as hereinafter described. This cylindrical holder $g$ is adapted to slide freely on the shaft or rod $h$, fixed vertically in the base-plate $a$, and provided at its upper end with the quick screw-thread or helical groove $h'$, over which is fitted the nut $i$, secured to the top of the holder $g$ by the clamping-ring $i'$ and its thumb-screws $i^2$ $i^2$. Now, it will be observed that when the holder $g$, with the nut $i$ clamped rigidly thereto, is placed on the rod $h$, it will fall down on said rod, and at the same time, by reason of the nut $i$ working in the helical groove $h'$, be caused to rotate so that a helical motion is imparted to it, and it is the weight of this holder $g$, combined with the rotation controlling device $h'$ $i$, which constitutes the feeding means, by which a number of independent readings is had, or separate indications are helically marked on the paper $f$ by the device carried by the piston $d$.

In Fig. 1 the indication-receiver $f$ and its holder $g$ are represented by full lines in their lowest position, the dotted lines $f'$ showing their position when the apparatus is fixed in place ready to record pressure-indications. The holder $g$ is prevented from moving down by the escapement-pawl $j$, having a straight and a hooked retaining-edge equal in length to the vertical fall of the holder $g$, and arranged to engage with the teeth of the ratchet-wheel $k$, secured to or formed on the lower end of the holder $g$. This escapement-pawl $j$ is pivoted at its lower end to the base-plate $a$, and at its upper end in the arm $j'$, secured to the top of the bridge $c$, and is provided at its lower rear part with the flange or web $j^2$, vertically arranged, with a short inclined portion at its lower end, said web $j^2$ being engaged in a slot formed in the projection $b^2$ of the top plate, $b'$, of the piston $b$. By this means the motion of the piston $b$ positively operates the pawl $j$, the straight edge of the pawl being held in one of the ratchet-teeth of wheel $k$ when the piston is at rest in its lowest position, and the pawl is moved so that its hooked edge is held in one of the teeth, when the piston rises by the slot in the projection $b^2$ moving from the inclined to the straight vertical part of the web $j^2$.

The registering, indicating, or marking device consists of a small disk, $l$, partly cut away, as at $l'$, and having on the remainder of its periphery projecting points or needles $l^2$. The shaft or spindle of this disk is carried in bearings at the upper ends of the links $m$, which links are pivoted at their lower ends to the projection $b^3$ of the top plate, $b'$, of piston $b$. The side of the upper bearings of links $m$ are adapted to slide along the front edges and into the inclined recesses of the guide-frame $n$, which is secured to the upper part of the bridge $c$. The lower ends of the sides of the guide-frame $n$ are connected together by the inclined plate $n'$, whose inclination corresponds to that of the recess in the front edges of the guide, and is so located in relation thereto that when the tops of the bearings of the links $m$ slide into the recesses the straight part $l'$ of the disk $l$ is in contact with and slides along the top of the plate $n'$, as shown at Fig. 6. The piston $b$ is now in its lowest position, and the marking-disk $l$ entirely clear of the paper covering $f$ of the holder $g$. Upon an upward movement of the piston taking place, due to an excess of pressure in the boiler, the disk $l$ is first caused to move toward the paper $f$, along the inclined plate $n'$, until the bearings of the links $m$ clear the inclined recesses in the guide $n$, by which time one of the needle-points, $l^2$, has punctured the paper, thereby indicating such excess of pressure, and a continued upward movement of the piston and links $m$ causes the disk to be rotated by its successive needle-points puncturing the paper. The disk $l$ is held against the paper by the bearings of the links $m$ sliding up the vertical parts of the guide $n$, as shown at Fig. 5. As the disk $l$ moves back its straight side $l'$ comes in contact with the inclined plate $n'$, which causes it always to assume the same position when away from the paper and insures its proper presentation to the paper each time an indication of pressure is recorded.

To prevent tampering with the apparatus, the cover $o$, by its recessed flange, rests on the edge of the base-plate $a$. At one side of the recessed flange is formed a lip, $o'$, which catches under the base-plate, and on the opposite side is a lug, $o^2$, which passes through a slot in the base-plate. A hole is formed in this lug $o^2$ below the base-plate, through which the ring of the padlock $p$ is placed.

Figs. 7, 8, and 9 show a modification in the arrangement of the various parts of the apparatus, their construction and operation being substantially as before described. The piston $b$, with its balancing spring $e$ and bridge $c$, is centrally arranged with the helically-grooved rod $h$, secured in the top of the bridge $c$, and the cylindrical holder $g$, provided with a releasable nut, fitted to slide thereon and over the sides of the bridge $c$. The indicating-disk $l$ and escapement-pawl $j$ are controlled by and actuated from an arm projecting from the top plate of the piston $b$. The protecting-covering $q$ in this case is shown attached to the base-plate by means of bayonet-connections with a flange on the top of the base-plate, a lock, $r$, holding the cover securely in position. The pawl $j$ is actuated by a pin in the piston-plate working in a slot, $j^3$, in the pawl-spindle.

The operation is as follows: A paper covering, $f$, which may be marked with a helical line, as shown, or not, as desired, is placed on the holder $g$, which for this purpose may be removed by loosening the thumb-screws $i^2$ $i^2$, thus allowing the nut $i$ to rotate as the holder $g$ is lifted vertically, the tooth of the ratchet $k$, in contact with the pawl $j$, sliding up said pawl during this removal of the holder. In replacing the holder it is so set that the ratchet $k$ is just below the marking-disk $l$, and the nut $i$ is then firmly clamped to the holder by tightening the set-screws $i^2$ $i^2$. The pawl $j$, by its straight edge engaging one of the teeth of the ratchet-wheel $k$, retains the holder $g$ in this upper position, which it will continue to do until the pressure acting on the piston $b$ is sufficient to counteract the opposing force of the spring $e$, which, for example, we will assume is set to oppose a pressure of eighty pounds to the square inch. Now, when a pressure of eighty pounds is attained, the piston $b$ will be raised, the first part of its movement causing the pawl $j$ to be rocked on its pivot, so that its hooked edge is in position to engage one of the teeth of the ratchet-wheel $k$ before the straight edge leaves its tooth, a slight downward and rotary movement of the holder $g$ then taking place, which is checked when the hooked edge engages a tooth. The marking-disk $l$ has also moved upward and forward, and by the time the pressure reaches, say, eighty-five pounds, its front needle has punctured the paper $f$. If the pressure exceeds this amount, the piston will be moved a farther given distance for each equal increment of pressure, and other punctures made in the paper by the needle-points on the disk $l$ as it moves up, each puncture-mark representing each of said increments, which may be five, ten, or any number of pounds desired. When the pressure falls back to the normal working limit or point at which the apparatus is set to operate, all the parts assume the positions occupied in Figs. 1 and 2, the straight edge of the pawl $j$ now being engaged with the succeeding tooth of the ratchet $k$, thus positively retaining the holder $g$ in this position until the normal working pressure is again exceeded. By these successive operations a series of vertical lines of puncture marks is made, helically arranged, each set of marks indicating clearly the pressure under which the piston has acted, as shown at Fig. 7, and the number of sets of marks showing the number of times the pressure has been allowed to pass beyond the normal working limit. The helical movement of the holder provides for a large number of indications being made on one piece of paper, so that it will have to be but seldom renewed.

By utilizing the force of gravity as the motive power of an apparatus for recording pressures, combined with the simple and positive acting feeding and marking devices, I am enabled to produce a strong, simple, and effective apparatus, well adapted to withstand the rough usage which this class of machines are often subjected to.

Having now described the nature of my invention and ascertained practical applications of the same, I wish it understood that I do not restrict myself to the use of a piston moving under variable pressures as the means for actuating the feeding and marking devices of a motor-recorder, in which gravity is the motive power, as it is evident that any device moving under the influence of variable pressures can be used for this purpose; but

What I claim, and desire to secure by Letters Patent, is—

1. In a pressure-recorder, an indication-receiver constructed substantially as described operated by the force of gravity acting on its mass, as and for the purpose set forth.

2. In a pressure-recorder, in combination, an indication-receiver operated by the force of gravity, a locking device for holding the indication-receiver stationary, an indicating device for marking indications thereon, and means actuated by variable pressures by which the locking device is caused to release the indication-receiver and the indicating device is operated, substantially as and for the purpose set forth.

3. In a pressure-recorder, a cylindrical indication-receiver, in combination with means, substantially as described, by which it is caused by the action of gravity thereon to move helically, as set forth.

4. In a pressure-recorder, in combination, a helically-moving indication-receiver, means for holding and causing it to rotate as it is acted upon by gravity, a locking device for holding the indication-receiver stationary, an indicating device for marking indications thereon, and a pressure-actuated device connected to the locking and indicating devices, substantially as set forth.

5. In a pressure-recorder, in combination, a cylindrical indication-receiver provided with a ratchet-wheel on its lower end, a releasable nut on its upper end, a vertical rod upon which the cylinder is fitted to slide and having a screw-thread or helical groove in which the nut works, and a vertical escapement-pawl arranged to engage in the teeth of the ratchet-wheel, substantially as set forth.

6. In a pressure-recorder, in combination, an indication-receiver, an indicating device composed of a disk having a flat formed thereon, and marking-needles in its periphery, vertical guides having inclined recesses and located in front of the receiver, an inclined plate upon which the flat of the disk works when its bearings move into the inclined recesses, and means for imparting vertical motion to the disk, whereby it is first caused to move forward toward the receiver and then to rotate thereon by its marking-needles puncturing the same, substantially as set forth.

7. In a pressure-recorder, the cylinder $g$, provided with the paper covering $f$, and having the nut $i$ clamped on its upper end, in combination with the vertical rod $h$, provided with the helical groove $h'$, substantially as set forth.

8. In a pressure-recorder, the combination, with the cylinder $g$, nut $i$, helically-grooved rod $h$, and ratchet-wheel $k$, secured to the lower end of the cylinder, of the vertically-arranged escapement-pawl $j$, having long retaining-edges adapted to engage with the teeth of the ratchet-wheel $i$ in all positions of the cylinder $g$ on the rod $h$, substantially as and for the purpose set forth.

9. In a pressure-recorder, in combination, the piston $b$, provided with a groove in an arm projecting therefrom, the escapement-pawl having a flange, $j^2$, inclined at its lower end and embraced by said groove, the ratchet-wheel $k$, cylinder $g$, and vertical rod $h$, substantially as set forth.

10. In a pressure-recorder, in combination, the cylindrical indication-receiver $g\ g'\ f$, the guide-rod $h$, puncturing-disk $l\ l^2$, guides $n\ n'$, links $m\ m$, and piston $b$, substantially as set forth.

In witness whereof I have hereunto set my hand, at New York, county and State of New York, this 10th day of August, 1885.

ALFRED SHEDLOCK.

Witnesses:
F. W. CRONKHITE,
LOUIS STARRETT.